United States Patent
Yang et al.

(10) Patent No.: US 8,979,963 B2
(45) Date of Patent: Mar. 17, 2015

(54) SUSPENDED CEILING FILTRATION APPARATUS

(75) Inventors: Weibing Yang, Shenzhen (CN); Chun-hao Wu, Shenzhen (CN); Kun-hsien Lin, Shenzhen (CN); Yongqiang Wang, Shenzhen (CN); Erqing Zhu, Shenzhen (CN); Xiande Li, Shenzhen (CN); Minghu Qi, Shenzhen (CN); Zenghong Chen, Shenzhen (CN); Zhenhua Guo, Shenzhen (CN); Yunshao Jiang, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 13/502,747

(22) PCT Filed: Mar. 22, 2012

(86) PCT No.: PCT/CN2012/072813
§ 371 (c)(1), (2), (4) Date: Apr. 19, 2012

(87) PCT Pub. No.: WO2013/139024
PCT Pub. Date: Sep. 26, 2013

(65) Prior Publication Data
US 2015/0000236 A1    Jan. 1, 2015

(30) Foreign Application Priority Data
Mar. 20, 2012 (CN) .......................... 2012 1 0074501

(51) Int. Cl.
*B01D 46/00* (2006.01)
*F24F 13/28* (2006.01)
*F24F 3/16* (2006.01)
*B01D 46/10* (2006.01)
*B01D 29/52* (2006.01)

(52) U.S. Cl.
CPC ............ *F24F 13/28* (2013.01); *B01D 46/0019* (2013.01); *B01D 2279/51* (2013.01); *F24F 3/161* (2013.01); *B01D 46/10* (2013.01); *F24F 3/1607* (2013.01); *B01D 29/52* (2013.01); *F24F 3/1603* (2013.01)
USPC .......................................................... 55/483

(58) Field of Classification Search
USPC ................. 55/385.2, 422, 484, 502; 454/187; 95/273, 286
See application file for complete search history.

(56) References Cited

U.S. PATENT DOCUMENTS

| | | | | |
|---|---|---|---|---|
| 4,477,263 A * | 10/1984 | Shaver et al. | ....................... | 95/7 |
| 5,192,348 A * | 3/1993 | Ludwig | ......................... | 55/385.2 |
| 5,993,519 A * | 11/1999 | Lim et al. | ......................... | 95/286 |
| 7,128,771 B2 * | 10/2006 | Harden | ......................... | 55/385.2 |
| 7,918,911 B2 * | 4/2011 | Cursetjee et al. | ............. | 55/385.2 |
| 2003/0150196 A1 * | 8/2003 | Duffy | ........................... | 55/385.2 |

* cited by examiner

Primary Examiner — Duane Smith
Assistant Examiner — Minh-Chau Pham
(74) Attorney, Agent, or Firm — Mark M. Friedman

(57) ABSTRACT

The present invention discloses a suspended ceiling filtration apparatus, which includes filtration units. The filtration unit includes a filtration part, two horizontal strip support legs and two longitudinal strip support legs. A support plate protrudes from the support legs. The filtration part is placed on the support plate, and a buffer filling part is disposed between the filtration part and the support plate. The buffer filling part is utilized to self-adaptively swell and shrink relative to the support plate according to a weight of the supported filtration part, the buffer filling part fills a gap between the support plate and the filtration part.

18 Claims, 5 Drawing Sheets

US 8,979,963 B2

SUSPENDED CEILING FILTRATION APPARATUS

FIELD OF THE INVENTION

The present invention relates to a liquid crystal display (LCD) production technique, and especially to a suspended ceiling filtration apparatus.

BACKGROUND OF THE INVENTION

With a growing development in LCD production techniques, there is a high demand for LCD production efficiency.

In a production work-place of the LCDs, an air purifying equipment such as a suspended ceiling filtration apparatus is essential. Referring to FIG. 1, FIG. 1 is a top view schematically illustrating a suspended ceiling filtration apparatus in the prior art.

The suspended ceiling filtration apparatus includes keels 11 and filtration parts 12, and the filtration parts 12 can be blind disks or fan filter units (FFU).

Referring to FIG. 2 and FIG. 1, the keels 11 are sectionally coupled to each other and hung from a ceiling. A structure of the filtration part 12 is a square plate. The keel 11 includes a keel body 111, and a support plate 112 extends from the keel body 111. The filtration part 12, which is disposed on the support plate 112, is held and fixed by the support plate 112.

In order to ensure that the keel 11 seamlessly contacts the filtration part 12 without a gap so as to isolate impure air, except for a high-quality hoisting assembly on the keel 11, a foam tape 13 is added to the space between the support plate 112 and the filtration part 12 in the prior art. The foam tape 13 can fill the possible gaps there-between the support plate 112 and the filtration part 12, and a thickness of the foam tape 13 is generally 2 millimeters.

However, in practical executions, it is quite difficult to keep the high-quality hoisting assembly because the keel 11 is quite enormous and there are many in quantity. Furthermore, a level of the keel 11 will change after being used for some time, it is more difficult to assure consistency in a standard direction. Once the consistency in the standard direction can not be assured, it can easily lead to gaps forming between the keel 11 and the filtration part 12, which further leads to less effective filtration on the suspended ceiling filtration apparatus.

Moreover, after being in use for some time, the foam tape 13 easily becomes hardened due to the pressure of the filtration part 12, causing an elastic range of the foam tape 13 to become smaller, even to become a plate structure without elasticity. Thus, there is a gap existing between the keel 11 and the filtration part 12, similarly causing the filtration effect of the suspended ceiling filtration apparatus to become less effective.

In existing technology, the above-mentioned gap is typically sealed by silicon or aluminized paper. In this manner, it is labor-intensive, also not guaranteed to have stability, this can greatly influence products.

In summary, there is a need to solve the problems of the less effective filtration and the ill influence on the products due to the gap existing between the keel and the filtration part in the prior art.

SUMMARY OF THE INVENTION

An objective of the present invention is to provide a suspended ceiling filtration apparatus which can solve the problem that In order to solve this shortcoming, the present invention provides a suspended ceiling filtration apparatus, which includes a plurality of filtration units, each of the filtration units comprising two horizontal strip support legs and two longitudinal strip support legs. The strip support legs intersect to define a filtration area. The support legs include a main part of the support legs and a support plate. The support plate from the main part of the support legs extends to the filtration area.

The suspended ceiling filtration apparatus further includes a filtration part, which is disposed on the support plate. A buffer filling part is disposed between the filtration part and the support plate. The buffer filling part includes a saclike sealing chamber.

The buffer filling part is utilized to self-adaptively swell and shrink relative to the support plate according to a weight of the supported filtration part, so as to fill a gap between the support plate and the filtration part.

In the suspended ceiling filtration apparatus of the present invention, the buffer filling part further comprises an abutted stripe, which is connected to the saclike sealing chamber; the abutted stripe abuts on the support plate.

In the suspended ceiling filtration apparatus of the present invention, both the abutted stripe and the saclike sealing chamber are made of elastic materials.

In the suspended ceiling filtration apparatus of the present invention, the buffer filling part is an annular structure for adaptively coupling to the support plate within the filtration area.

In the suspended ceiling filtration apparatus of the present invention, the main part of the support legs has a fixing cavity corresponding to the support plate, and the fixing cavity accommodates and fixes a locking bracket.

In the suspended ceiling filtration apparatus of the present invention, the support plate has an extension length in a direction along which the main part of the support legs extends, and the filtration area has a filtration width; the extension length is less than the filtration width.

In the suspended ceiling filtration apparatus of the present invention, the buffer filling part has a buffered length in a direction along which the support plate extends from the main part of the support legs, and the buffered length is less than the extension length.

In the suspended ceiling filtration apparatus of the present invention, a range of the extension length is 10 millimeters to 20 millimeters.

Another objective of the present invention is to provide a suspended ceiling filtration apparatus which can solve the problems of the less effective filtration and the ill influence on the products due to the gap existing between the keel and the filtration part in the prior art.

In order to solve this shortcoming, the present invention provides a suspended ceiling filtration apparatus, which includes a plurality of filtration units. Each of the filtration units comprises two horizontal strip support legs and two longitudinal strip support legs. The strip support legs intersect to define a filtration area, and a support plate extends toward the filtration area from the support legs.

The suspended ceiling filtration apparatus further comprises a filtration part, which is disposed on the support plate. A buffer filling part is disposed between the filtration part and the support plate.

The buffer filling part is utilized to self-adaptively swell and shrink relative to the support plate according to a weight of the supported filtration part, so as to fill a gap between the support plate and the filtration part.

In the suspended ceiling filtration apparatus of the present invention, the buffer filling part comprises a saclike sealing chamber.

In the suspended ceiling filtration apparatus of the present invention, the buffer filling part further comprises an abutted stripe, which is connected to the saclike sealing chamber; the abutted stripe abuts on the support plate.

In the suspended ceiling filtration apparatus of the present invention, both the abutted stripe and the saclike sealing chamber are made of elastic materials.

In the suspended ceiling filtration apparatus of the present invention, the buffer filling part is an annular structure for adaptively coupling to the support plate within the filtration area.

In the suspended ceiling filtration apparatus of the present invention, the support legs comprise a main part of the support legs, and the support plate from the main part of the support legs extends to the filtration area.

In the suspended ceiling filtration apparatus of the present invention, the main part of the support legs has a fixing cavity corresponding to the support plate, and the fixing cavity accommodates and fixes a locking bracket.

In the suspended ceiling filtration apparatus of the present invention, the support plate has an extension length in a direction along which the main part of the support legs extends, and the filtration area has a filtration width; the extension length is less than the filtration width.

In the suspended ceiling filtration apparatus of the present invention, the buffer filling part has a buffered length in a direction along which the support plate from the main part of the support legs extends to the filtration area, and the buffered length is less than the extension length.

In the suspended ceiling filtration apparatus of the present invention, a range of the extension length is 10 millimeters to 20 millimeters.

Compared with the prior art, according to the buffer filling part disposed between the filtration part and the support plate, the buffer filling part can self-adaptively swell and shrink relative to the support plate according to a weight of the supported filtration part, so as to fill a gap between the support plate and the filtration part, thereby ensuring a better filtration effect of the suspended ceiling filtration apparatus.

It is to be understood that both the foregoing general description and the following detailed description of the present invention are exemplary and explanatory and are intended to provide further explanation of the invention as claimed.

DETAILED DESCRIPTION OF THE PREFERRED EMBODIMENTS

Descriptions of the following embodiments refer to attached drawings which are utilized to exemplify specific embodiments.

Figure 1:
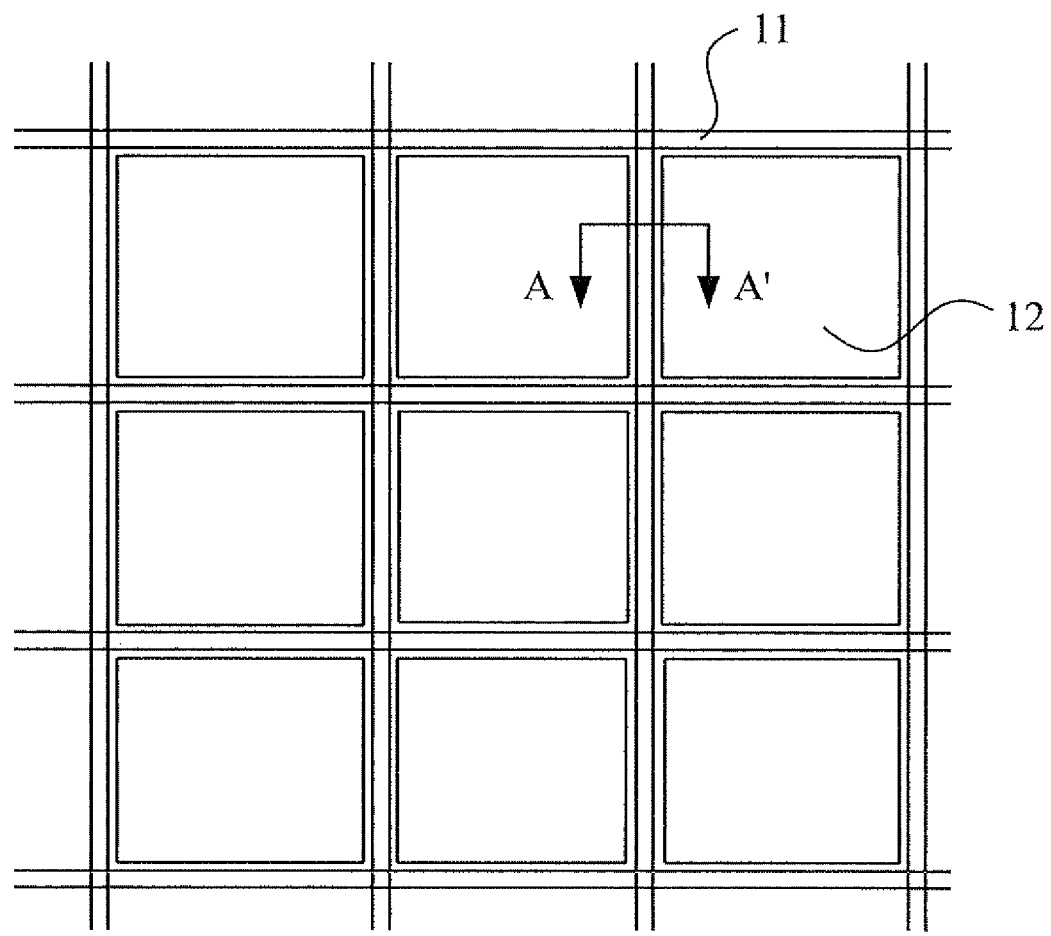
FIG. 1 is a top view schematically illustrating a suspended ceiling filtration apparatus in the prior art.
Figure 2:
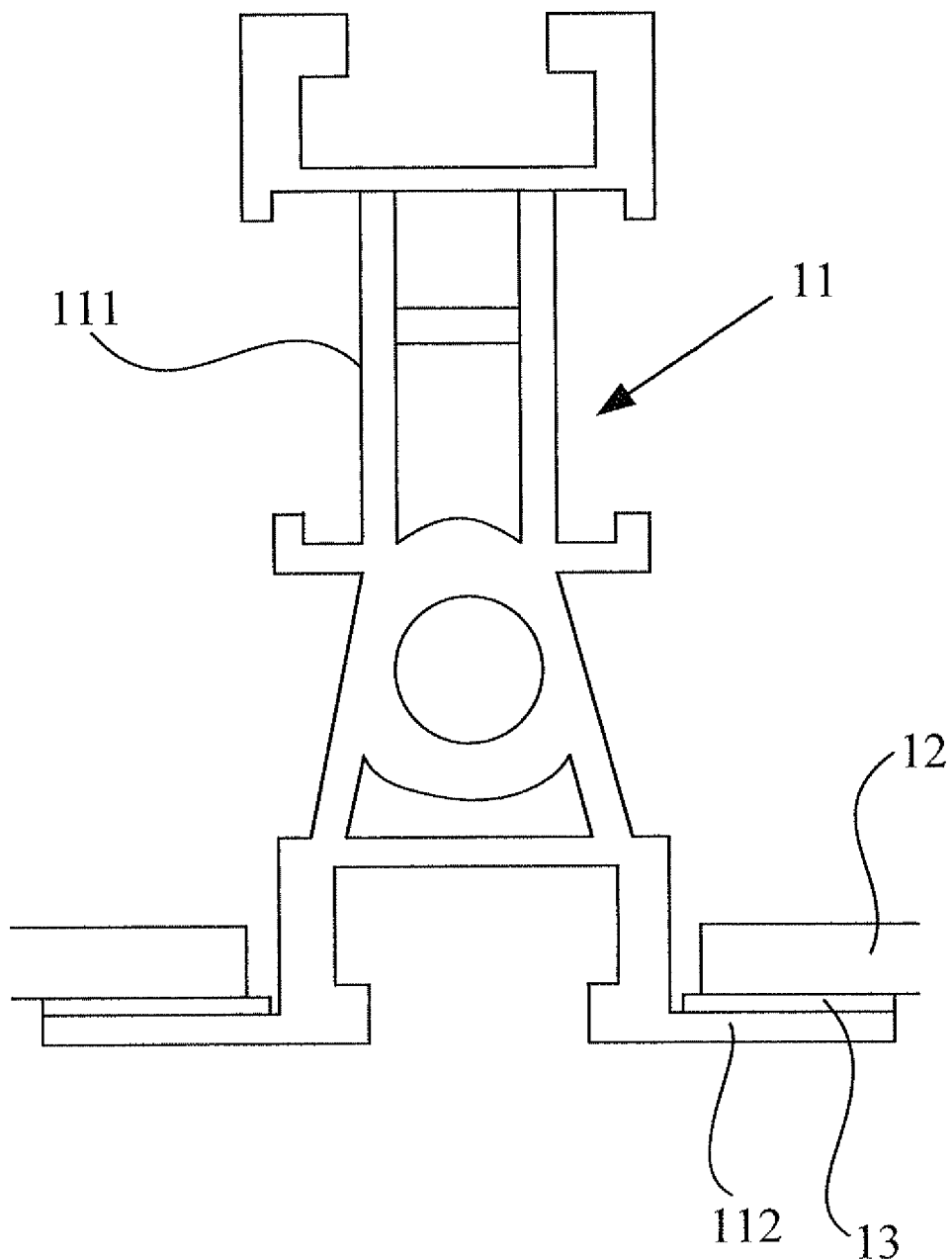
FIG. 2 is a schematic cross-sectional diagram along A-A' in FIG. 1.
Figure 3:
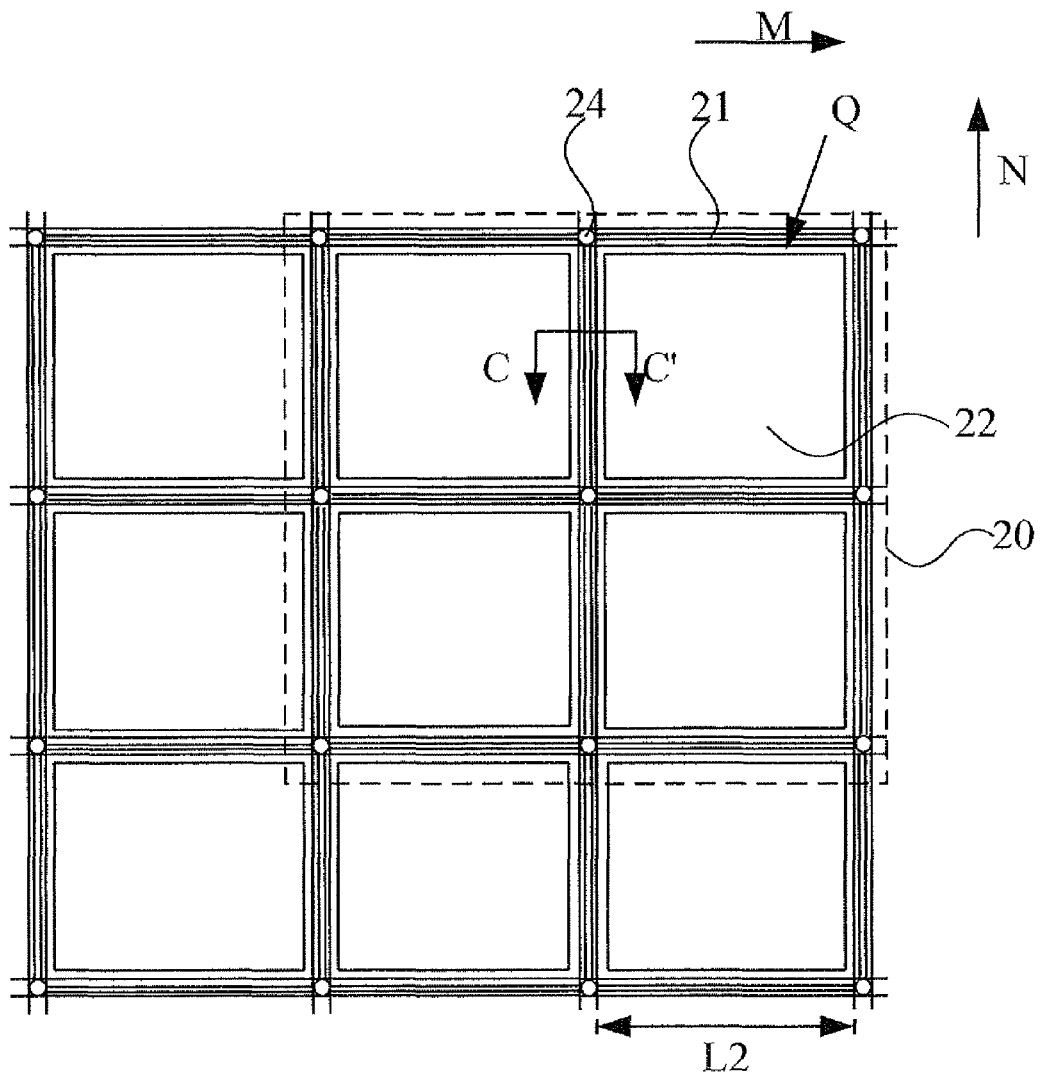
FIG. 3 is a schematic drawing illustrating a preferred embodiment of a suspended ceiling filtration apparatus according to the present invention.

Referring to FIG. 3, FIG. 3 is a top view schematically illustrating a preferred embodiment of a suspended ceiling filtration apparatus according to the present invention.

The suspended ceiling filtration apparatus includes a plurality of filtration units 20. Each of the filtration units 20 includes two horizontal strip support legs 21 in horizontal direction M and two longitudinal strip support legs in longitudinal direction N. The support legs 21 are strip shapes, and said four support legs 21 are connected end-to-end sequentially for defining a filtration area Q. There is a filtration part 22 disposed in the filtration area Q, and the filtration parts 12 can be a blind disk or a fan filter unit (FFU). The support legs 21 of the different filtration units 20 are connected to each other via coupling axes 24.

Figure 4:
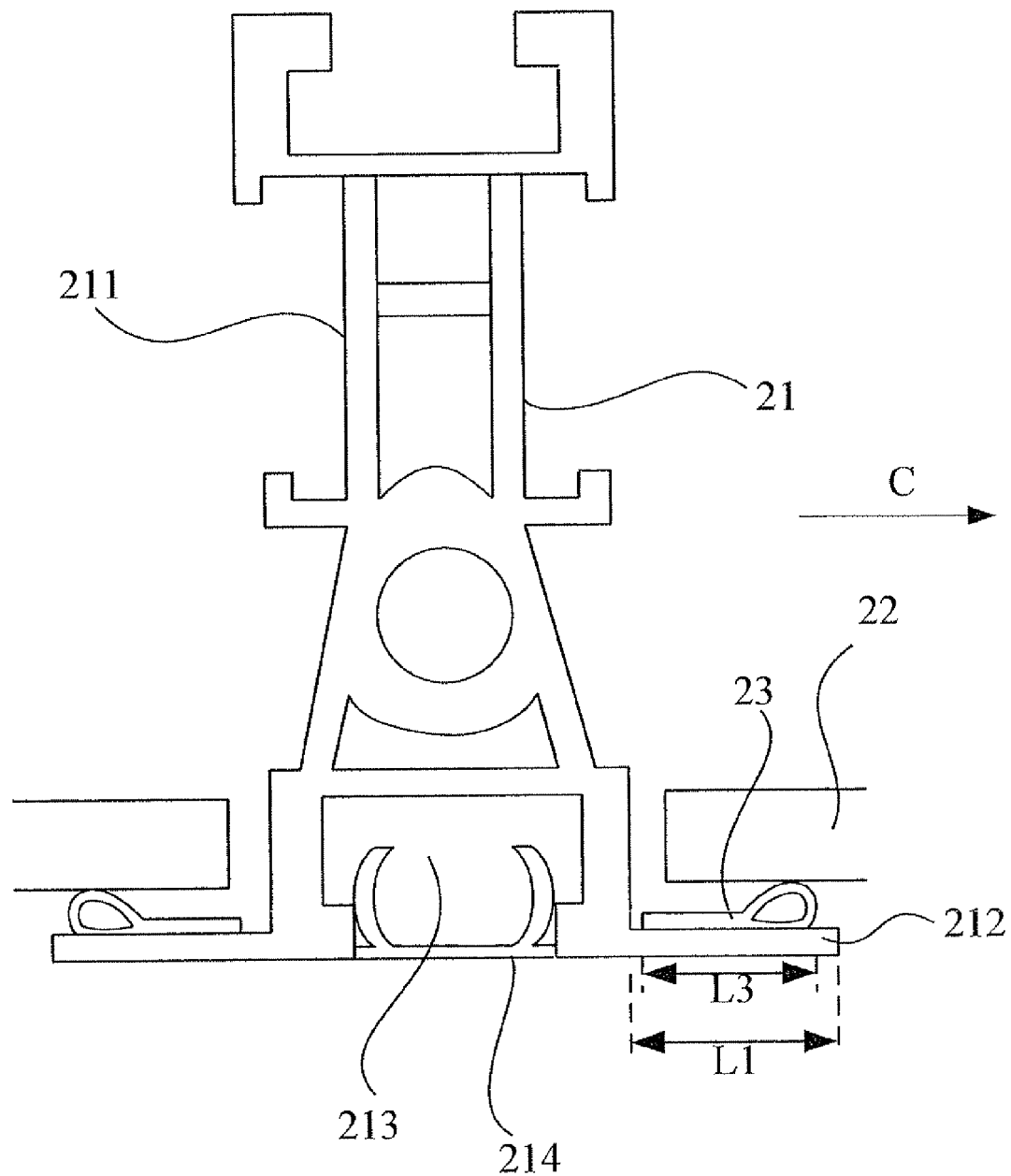
FIG. 4 is a schematic cross-sectional diagram along C-C' in FIG. 3.

Referring to FIG. 4 and FIG. 3, FIG. 4 is a schematic cross-sectional diagram along C-C' in FIG. 3.

The support legs 21 include a main part of the support legs 211, a support plate 212, a fixing cavity 213 and a locking cell 214. Here, the support plate 212 extends form the main part of the support legs 211 along a direction C toward the filtration area Q. The fixing cavity 213 is located at the main part of the support legs 211 and corresponds to the support plate 212. The locking cell 214 is fixed in the fixing cavity 213, and the locking cell 214 is utilized to externally couple with other supported portion.

Referring to FIG. 3 and FIG. 4, the filtration part 22 is placed on the support plate 212, and a buffer filling part 23 is disposed between the filtration part 22 and the support plate 211.

Figure 5:
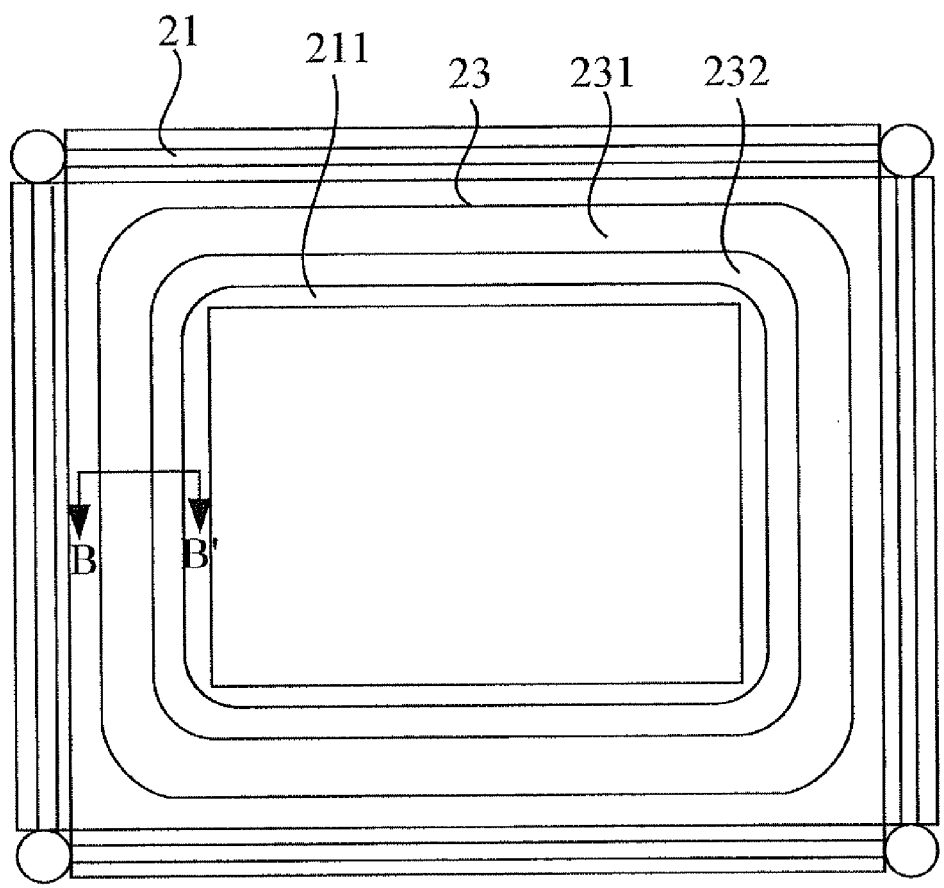
FIG. 5 is a schematic drawing illustrating the filtration part being not disposed in FIG. 3.

Referring to FIGS. 3 to 5, FIG. 5 is a schematic drawing illustrating the filtration part 22 being not disposed in FIG. 3. In the embodiment, the buffer filling part 23 is an annular structure for adaptively coupling to the support plate 212 of the filtration area Q. Certainly, in practical execution, the buffer filling part 23 also can be composed of a plurality of strip structures parallel to the support legs 21, and the structures have the same technical effect of the structure of FIG. 5. The difference therebetween is that the annular structure of FIG. 5 can prevent intersections of the support legs 21 from the gaps appearing, and the effect thereof is better.

Figure 6:
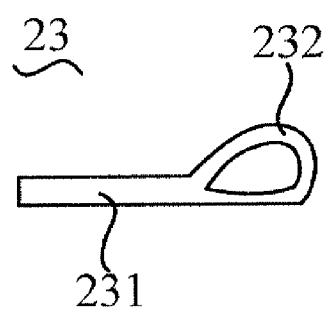
FIG. 6 is a schematic cross-sectional diagram along B-B' in FIG. 5.

Referring to FIG. 6 and FIG. 5, FIG. 6 is a schematic cross-sectional diagram illustrating the buffer filling part 23.

The buffer filling part 23 includes an abutted stripe 231 and a saclike sealing chamber 232. The saclike sealing chamber 232 is connected to the saclike sealing chamber the abutted stripe abuts on 232, the support plate 211. The abutted stripe 231 adjoins the support plate 211. Furthermore, the saclike sealing chamber 232 is an air chamber. Certainly, in practical execution, the buffer filling part 23 can only include the saclike sealing chamber 232, and the structure thereof has the same technical effect of the structure of FIG. 6.

In practical execution, both the abutted stripe 231 and the saclike sealing chamber 232 are made of elastic materials, such as thermoplastic polyurethanes (TPU).

Referring to FIG. 3 and FIG. 4, the support plate 212 has an extension length L1 in a direction C along which the support plate 212 from the main part of the support legs 211 extends to the filtration area. A range of the extension length is 10 millimeters to 20 millimeters, preferably 18.25 millimeters. The filtration area Q has a filtration width L2 (FIG. 3), and the extension length L1 is less than the filtration width L2. The extension length L1 of the support plate 212 is controlled within a smaller range such as 18.2 millimeters in the present invention for ensuring that the support plate 212 can support and fix the filtration part 22 without wasting too much material and ensuring that the filtration part 22 has a larger filtration area.

Referring to FIG. 4 again, the buffer filling part 23 has a buffered length L3 along the direction C, and the buffered length L3 is less than the extension length L1. In accordance with the present invention, the buffered length L3 of the buffer filling part 2 is controlled to less than the extension length L1 of the support plate 212, so as to ensure that the buffer filling part 23 can be completely disposed on the support plate 212 for preventing the buffer filling part 23 detaching from the support plate 212.

In the embodiment, the buffer filling part 23 can self-adaptively swell and shrink relative to the support plate 212 according to a weight of the supported filtration part 22, so as to fill the gap between the support plate 212 and the filtration part 22. Here, the "self-adaptively" means that the buffer filling part 23 can adjust itself to adapt to a dynamic pressure.

The structural principle of the suspended ceiling filtration apparatus shown in FIGS. 3 to 6 in the preferred embodiment is as follows.

The buffer filling part 23 is disposed on the support plate 212 of the filtration area Q, and then the filtration part 22 is disposed on the support plate 212. Under this condition, the filtration part 22 and the support plate 212 include the buffer filling part 23 therebetween.

When the suspended ceiling filtration apparatus is disposed on a top of the production shop of the LCDs, once the support legs 21 has no unity in the standard direction, the buffer filling part 23 can self-adaptively adjust according to the weight of the supported filtration part 22. That is, a portion that is subjected to high pressure shrinks relative to the support plate 212, and a portion that is subjected to low pressure swells relative to the support plate 212. The above-mentioned function enables the supported filtration part 22 to keep a high unity in the standard direction for ensuring the filtration effect of the suspended ceiling filtration apparatus.

Moreover, because the buffer filling part 23 can self-adaptively adjust according to the pressure of the supported filtration part 22, the buffer filling part 23 can quickly fill a gap even if there is a gap formed between the filtration part 22 and the support plate 212 due to other reason, so as to ensure the filtration effect of the suspended ceiling filtration apparatus.

According to the buffer filling part disposed between the filtration part and the support plate in the present invention, the buffer filling part can self-adaptively swell and shrink relative to the support plate according to a weight of the supported filtration part, so as to fill a gap between the support plate and the filtration part, thereby ensuring a better filtration effect of the suspended ceiling filtration apparatus.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A suspended ceiling filtration apparatus, comprising a plurality of filtration units, each of the filtration units comprising two horizontal strip support legs and two longitudinal strip support legs; the strip support legs intersecting for defining a filtration area, the support legs comprising a main part and a support plate, the support plate from the main part of the support legs extending to the filtration area;
the suspended ceiling filtration apparatus further comprising a filtration part, the filtration part being disposed on the support plate, wherein a buffer filling part is disposed between the filtration part and the support plate, and the buffer filling part comprises a saclike sealing chamber;
the buffer filling part being utilized for self-adaptively swelling and shrinking relative to the support plate according to a weight of the supported filtration part, wherein a portion of the buffer filling part subjected to a high pressure shrinks relative to the support plate, and a portion of the buffer filling part subjected to a low pressure swells relative to the support plate, for filling a gap between the support plate and the filtration part.

2. The suspended ceiling filtration apparatus according to claim 1, wherein the buffer filling part further comprises an abutted stripe, which is connected to the saclike sealing chamber; the abutted stripe abuts the support plate.

3. The suspended ceiling filtration apparatus according to claim 2, wherein both the abutted stripe and the saclike sealing chamber are made of elastic materials.

4. The suspended ceiling filtration apparatus according to claim 1, wherein the buffer filling part is an annular structure for adaptively coupling to the support plate within the filtration area.

5. The suspended ceiling filtration apparatus according to claim 1, wherein the main part of the support legs has a fixing cavity corresponding to the support plate, and the fixing cavity accommodates and fixes a locking bracket.

6. The suspended ceiling filtration apparatus according to claim 5, wherein the support plate has an extension length in a direction along which the main part of the support legs extends, and the filtration area has a filtration width; the extension length is less than the filtration width.

7. The suspended ceiling filtration apparatus according to claim 6, wherein the buffer filling part has a buffered length in a direction along which the support plate from the main part of the support legs is extended to the filtration area, and the buffered length is less than the extension length.

8. The suspended ceiling filtration apparatus according to claim 7, wherein a range of the extension length is 10 millimeters to 20 millimeters.

9. A suspended ceiling filtration apparatus, comprising a plurality of filtration units, each of the filtration units comprising two horizontal strip support legs and two longitudinal strip support legs; the strip support legs intersecting to define a filtration area, and a support plate extending toward the filtration area from the support legs;
the suspended ceiling filtration apparatus further comprising a filtration part, the filtration part disposed on the support plate, wherein a buffer filling part is disposed between the filtration part and the support plate;
the buffer filling part utilized to self-adaptively swell and shrink relative to the support plate according to a weight of the supported filtration part, wherein a portion of the buffer filling part subjected to a high pressure shrinks relative to the support plate, and a portion of the buffer filling part subjected to a low pressure swells relative to the support plate, so as to fill a gap between the support plate and the filtration part.

10. The suspended ceiling filtration apparatus according to claim 9, wherein the buffer filling part comprises a saclike sealing chamber.

11. The suspended ceiling filtration apparatus according to claim 10, wherein the buffer filling part further comprises an abutted stripe, which is connected to the saclike sealing chamber; the abutted stripe abuts on the support plate.

12. The suspended ceiling filtration apparatus according to claim 11, wherein both the abutted stripe and the saclike sealing chamber are made of elastic materials.

13. The suspended ceiling filtration apparatus according to claim 10, wherein the buffer filling part is an annular structure for adaptively coupling to the support plate within the filtration area.

14. The suspended ceiling filtration apparatus according to claim 9, wherein the support legs comprise a main part, the support plate from the main part of the support legs extends to the filtration area.

15. The suspended ceiling filtration apparatus according to claim 14, wherein the main part of the support legs has a fixing cavity corresponding to the support plate, and the fixing cavity accommodates and fixes a locking bracket.

16. The suspended ceiling filtration apparatus according to claim 14, wherein the support plate has an extension length in a direction along which the main part of the support legs extends, and the filtration area has a filtration width; the extension length is less than the filtration width.

17. The suspended ceiling filtration apparatus according to claim 16, wherein the buffer filling part has a buffered length in a direction along which the support plate from the main part of the support legs extends, and the buffered length is less than the extension length.

18. The suspended ceiling filtration apparatus according to claim 17, wherein a range of the extension length is 10 millimeters to 20 millimeters.

* * * * *